(12) United States Patent
Schofield (10) Patent No.: US 10,947,974 B2
(45) Date of Patent: Mar. 16, 2021

(54) VACUUM SCROLL PUMP

(71) Applicant: Edwards Limited, Burgess Hill (GB)

(72) Inventor: Nigel Paul Schofield, Burgess Hill (GB)

(73) Assignee: Edwards Limited, Burgess Hill (GB)

(*) Notice: Subject to any disclaimer, the term of this patent is extended or adjusted under 35 U.S.C. 154(b) by 173 days.

(21) Appl. No.: 16/309,809

(22) PCT Filed: May 25, 2017

(86) PCT No.: PCT/GB2017/051473
§ 371 (c)(1),
(2) Date: Dec. 13, 2018

(87) PCT Pub. No.: WO2017/220961
PCT Pub. Date: Dec. 28, 2017

(65) Prior Publication Data
US 2019/0309748 A1    Oct. 10, 2019

(30) Foreign Application Priority Data

Jun. 22, 2016  (GB) ..................... 1610896

(51) Int. Cl.
*F04C 18/02* (2006.01)
*F04C 27/00* (2006.01)
(Continued)

(52) U.S. Cl.
CPC .......... *F04C 18/0215* (2013.01); *F04C 25/02* (2013.01); *F04C 27/005* (2013.01);
(Continued)

(58) Field of Classification Search
CPC ...... F04C 18/0215–0223; F04C 27/005; F04C 25/02; F04C 29/0057; F04C 2230/10; F04C 2230/602; F16C 19/12; F16C 19/16
(Continued)

(56) References Cited

U.S. PATENT DOCUMENTS 5,759,020 A    6/1998  Shaffer

FOREIGN PATENT DOCUMENTS

JP   S61132492 U       8/1986
JP   H11-280673    *  10/1999
(Continued)

OTHER PUBLICATIONS

British Search Report dated Sep. 9, 2016 and Examination Report dated Sep. 12, 2016 for corresponding British Application No. GB1610896.1.

(Continued)

*Primary Examiner* — Alexander B Comley
(74) *Attorney, Agent, or Firm* — Theodore M. Magee; Westman, Champlin & Koehler, P.A.

(57) ABSTRACT

A scroll vacuum pump includes an orbiting scroll having a wall extending axially from an orbiting scroll base towards a fixed scroll, the fixed scroll having a fixed scroll wall extending axially from a fixed scroll base towards the orbiting scroll; an axially extending drive shaft having an eccentric shaft portion so that rotation of the eccentric shaft portion imparts an orbiting motion to the orbiting scroll relative to the fixed scroll; and an axial thrust bearing arrangement including an array of ball bearings for bearing against the orbiting scroll base in an axial direction, each ball bearing describing a circular path over the orbiting scroll base during orbiting motion; at least one thrust surface for bearing against the array of ball bearings; and an adjustment mechanism for adjusting the axial position of said at least one thrust surface and thereby the axial position of the orbiting scroll base.

9 Claims, 4 Drawing Sheets

(51) Int. Cl.
*F16C 19/12* (2006.01)
*F04C 25/02* (2006.01)
*F04C 29/00* (2006.01)
*F16C 19/16* (2006.01)

(52) U.S. Cl.
CPC .......... *F04C 29/0057* (2013.01); *F16C 19/12* (2013.01); *F04C 2220/10* (2013.01); *F04C 2230/602* (2013.01); *F16C 19/16* (2013.01)

(58) Field of Classification Search
USPC .............................. 418/55.5, 55.1, 55.3, 55.4
See application file for complete search history.

(56) References Cited

FOREIGN PATENT DOCUMENTS

| | | | |
|---|---|---|---|
| JP | H11280673 | A | 10/1999 |
| JP | 2001280267 | A | 10/2001 |
| JP | 2004211656 | A | 7/2004 |
| JP | 2007321646 | A | 12/2007 |
| JP | 4302851 | * | 7/2009 |
| WO | 2011135324 | A2 | 11/2011 |

OTHER PUBLICATIONS

PCT Search Report and Written Opinion dated Sep. 11, 2017 for corresponding PCT Application No. PCT/GB2017/051473.

* cited by examiner

VACUUM SCROLL PUMP

CROSS-REFERENCE OF RELATED APPLICATION

This application is a Section 371 National Stage Application of International Application No. PCT/GB2017/051473, filed May 25, 2017, and published as WO 2017/220961 A1 on Dec. 28, 2017, the content of which is hereby incorporated by reference in its entirety and which claims priority of British Application No. 1610896.1, filed Jun. 22, 2016.

FIELD

The invention relates to a vacuum scroll pump.

BACKGROUND

Scroll pumps are known hereto and have utility in many different vacuum applications for example for backing turbo-molecular pumps.

It is known to use a scroll pump with tip seals for sealing between the axial ends of the scroll walls and the bases of the opposing scrolls. Tip seals are troublesome because they produce tip seal dust which contaminates a clean environment and also require periodic replacement.

The discussion above is merely provided for general background information and is not intended to be used as an aid in determining the scope of the claimed subject matter. The claimed subject matter is not limited to implementations that solve any or all disadvantages noted in the background.

SUMMARY

The present invention provides a scroll vacuum pump comprising: an orbiting scroll having an orbiting scroll wall extending axially from an orbiting scroll base towards a fixed scroll, the fixed scroll having a fixed scroll wall extending axially from a fixed scroll base towards the orbiting scroll; an axially extending drive shaft having an eccentric shaft portion so that rotation of the eccentric shaft portion imparts an orbiting motion to the orbiting scroll relative to the fixed scroll; and an axial thrust hearing arrangement comprising: an array of ball bearings for bearing against the orbiting scroll base in an axial direction, each ball bearing describing a circular path over the orbiting scroll base during orbiting motion; at least one thrust surface for hearing against the array of ball hearings; and an adjustment mechanism for adjusting the axial position of said at least one thrust surface and thereby the axial position of the orbiting scroll base.

This scroll vacuum pump is arranged to allow use without tip seals.

Other preferred and/or optional aspects of the invention are defined in the accompanying claims.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In order that the present invention may be well understood two embodiments thereof, which are given by way of example only, will now be described, with reference to the accompanying drawings, in which.

DETAILED DESCRIPTION

Figure 1:
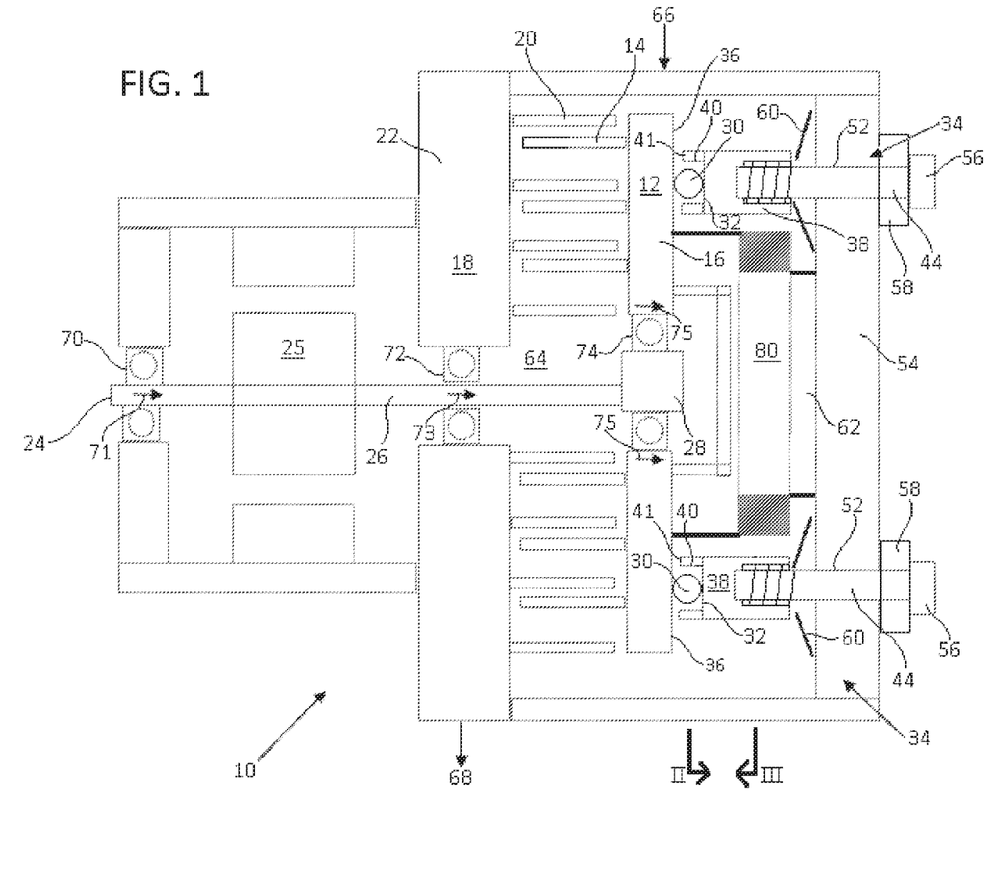
FIG. 1 shows schematically a scroll vacuum pump.

Referring to FIG. 1 there is shown a scroll vacuum pump 10 comprising two co-operating scrolls 12, 18. An orbiting scroll 12 has an orbiting scroll wall 14 extending axially from an orbiting scroll base 16 towards a fixed scroll 18. The fixed scroll has a fixed scroll wall 20 extending axially from a fixed scroll base 22 towards the orbiting scroll.

An axially extending drive shaft 24 is rotated by a motor 25 and has a concentric shaft portion 26 and an eccentric shaft portion 28. Rotation of the eccentric shaft portion imparts an orbiting motion to the orbiting scroll 12 relative to the fixed scroll 18 for pumping fluid from an inlet at a radially outer portion of the scrolls to an outlet at a radially inner portion of the scrolls.

In typical scroll pumps each of the scroll walls has a tip seal for sealing against the opposing scroll plate (or base) to provide an axial seal. The problem though with this arrangement is that tip seals are abraded in use because of surface friction and generate contaminating tip seal dust, and when they become too worn require replacement. The requirement for tip seals is derived in part from the difficulty of setting accurately the spacing between the orbiting and fixed scrolls.

The present arrangement as described herein may be used without tip seals or if tip seals were to be used they would generate less dust or require less frequent replacement.

An axial thrust bearing arrangement is provided as shown for accurately setting the spacing between the fixed and orbiting scrolls. The bearing arrangement comprises an array of ball bearings 30 for bearing against the orbiting scroll base 16 in an axial direction. Each ball rolls over the orbiting scroll base describing a circular path over the base during orbiting motion of the scrolls. At least one thrust surface 32 bears against the array of ball bearings. An adjustment mechanism 34 (shown generally by arrows in FIG. 1) adjusts the axial position of the or each thrust surface and thereby the axial position of the orbiting scroll base. In this way the position of orbiting scroll can be accurately adjusted relative to the fixed scroll.

Figure 2:
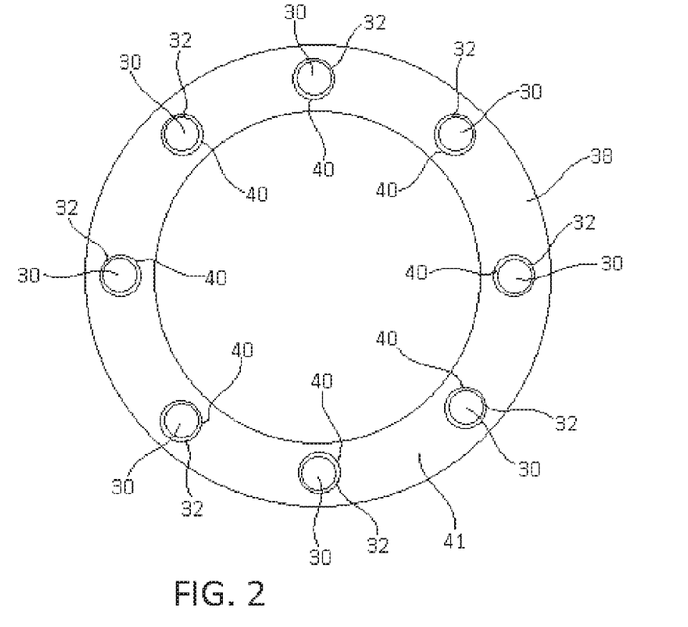
FIG. 2 shows a section of a retainer of the scroll vacuum pump taken along line II in FIG. 1.

As shown in FIGS. 1 and 2, the thrust bearing arrangement comprises an array of ball bearings 30. The ball bearings may be equally angularly spaced apart to provide a generally evenly distributed axial force and in this example, there are eight ball hearings angularly spaced apart (by 45 degrees) about a circumference of the orbiting scroll 12 for bearing against the outer planar surface 36 of the orbiting scroll base 16. There may be more or fewer ball bearings, but it is preferred that there are at least three ball bearings. Three ball bearings provide a minimum three points of contact for defining a plane, but typically, depending on the size of the pump and the size of the ball bearings there are between 6 and 10 ball bearings although any number could be selected.

In this example the ball bearings are spherical. The ball bearings roll over the surface of the orbiting scroll whilst applying a thrust force to limit axial movement of the orbiting scroll away from the fixed scroll. Other geometric shapes may be used provided they perform this function.

The ball bearings are preferably formed of a ceramics material because ceramics have a low mass. A low mass allows the orbiting scroll to be orbited at a higher frequency for any given arrangement and motor specification. Ceramics are also hard and resistant to compression.

The ball bearings 30 are retained by a retainer for locating the ball bearings in position relative to the orbiting scroll and the thrust surface or surfaces. The retainer may take any suitable form such as a cage but in this example is formed by a retaining ring 38. There may be one retainer or a plurality of retainers, or a retainer for each ball bearing.

The retaining ring 38 is annular and comprises a plurality of retaining portions 40 for at least partially receiving respective ball bearings. The retaining portions are formed by cups or recesses counter-sunk in an annular surface 41 of the ring facing towards the orbiting scroll 12 (and as explained in more detail below the thrust surfaces 32 are formed as part of the ring 38 in this example). The recesses 40 are sized dependent on the diameter of the ball bearings 30 and are preferably a small amount (such as 10%) larger to provide space for a lip seal between the recess walls and the ball bearings and also to allow for the circular movement of the ball bearings in the recesses. A lip seal 42 is shown in the enlarged view of FIG. 4 positioned between a ball bearing 30 and the walls of a recess 40. The lip seal surrounds the ball bearing and extends from the recess to press against the rear surface 36 of the orbiting scroll 12. Lubricant such as grease is located in the space between the lip seal and the ball bearing to lubricate movement of the ball bearing. The lip seals in this example are round but other shapes may be selected. Other types of seal may be adopted as an alternative to lip seals.

Referring again to FIGS. 2 and 4, the retaining ring 38 comprises thrust surfaces 32 for bearing against respective ball bearings. In other examples, there may be more than one retainer each of which comprises a thrust surface. There may be a single thrust surface for all of the ball bearings or a plurality of thrust surfaces each of which being either associated with one or a plurality of ball bearings.

Figure 4:
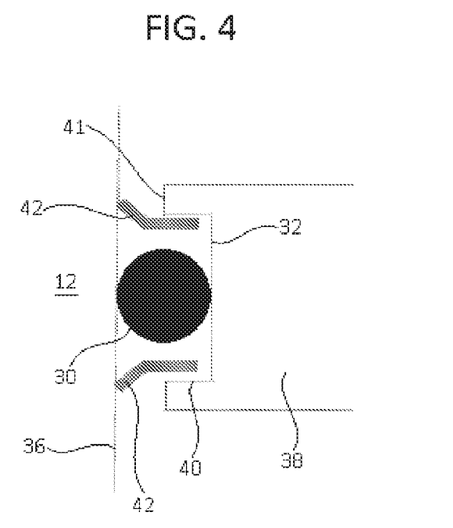
FIG. 4 shows an enlarged view of a ball bearing arrangement as shown in FIG. 1.

Each counter-sunk recess has a circular wall 40 and a base surface 32 which forms a thrust surface. The ball bearings 30 are retaining between the thrust surfaces and the rear planar surface 36 of the orbiting scroll 12 by the walls 40. In an alternative, an annular thrust surface may be formed as a base of an annular channel in a retainer or cage, and the ball bearings may be located adjacent each other in a ring throughout the annular channel.

In the illustrated example the orbiting scroll comprises a planar surface 36 over which the ball bearings describe a circular path and are retained by the retaining ring 38. In other examples, movement of the ball bearings may be constrained by formations in the orbiting scroll 12 or in a part or parts fixed relative to the orbiting scroll. These formations may be respective circular channels formed in the rear surface 36 of orbiting scroll for the ball bearings. The movement of the ball bearings is therefore constrained by the orbiting scroll and not the thrust surface which may be provided simply by a planar member for bearing against the ball bearings.

In a still further example, the orbiting scroll may comprise means such as a channel for constraining movement of the ball bearings and additionally there may be a retaining ring for retaining the ball bearings as previously described. This further example may be usefully configured for preventing rotation of the orbiting scroll but allowing orbiting motion, since the ball bearings are trapped between opposing lateral surface of the orbiting scroll and the retaining ring.

Figure 3:
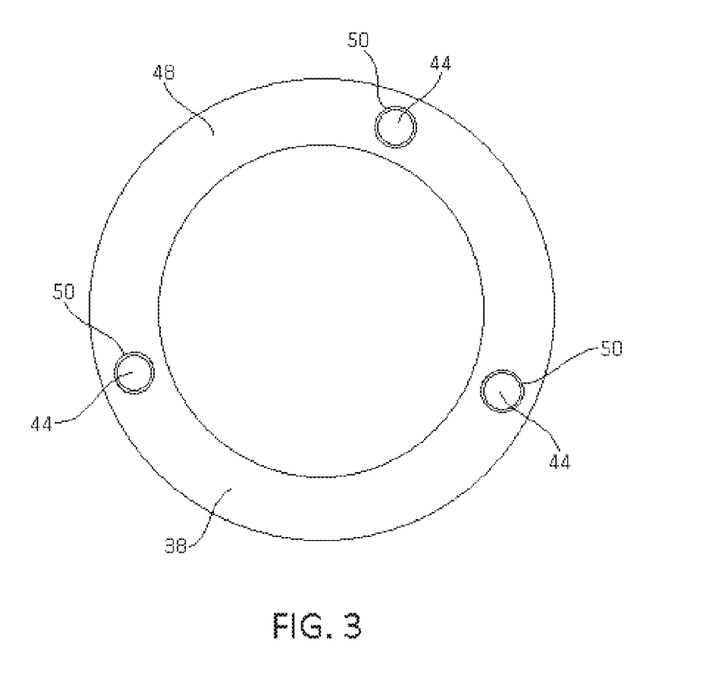
FIG. 3 shows a section of the retainer of the scroll vacuum pump taken along line III in FIG. 1.

Referring to FIG. 3, the retaining ring 38 comprises a second annular surface 48 on a side of the ring distal from the orbiting scroll and in this example generally parallel thereto. There is formed in the retaining ring a part of an adjustment mechanism for adjusting the position of the or each thrust surface 32. In this example, the retaining ring comprises bores 50 in the opposing annular surface 48. The bores may be counter-sunk in the annular surface or throughbores. In the latter case, as shown, the bores are off-set from recesses 40 on the other side of the ring. The bores 50 are threaded for co-operation with respective complementary threaded bolts, or screws, 44 as shown in FIG. 1. Rotation of the threaded bolts causes movement of the retaining in an axial direction in order to adjust the position of the retaining ring and therefore the thrust surfaces, the ball bearings and the orbiting scroll. As illustrated in FIG. 3 there are three threaded bolts 44 that co-operate with three threaded bores 50. It is useful to provide three points of adjustment as defining points of a plane of the retaining ring. In this regard, the retaining ring can be position by the three adjustment points in an axial direction and angularly to the axis, so that not only can the orbiting scroll be positioned closely adjacent the fixed scroll but also squarely thereto. The adjustment screws are positioned at an outer circumference relative to the orbiting scroll spaced away from the axis (and 'pivot' constituted by bearing 74) so that fine adjustment to the angle of the orbiting scroll can be performed.

Referring to FIG. 1, only two of the three threaded bolts 44 are shown in the schematic representation. The bolts extend through bores 52 in the pump housing part 54 and have bolt heads 56 external to the pump housing to allow manual rotation of the bolts for adjustment. In this example a washer 58 fits between the housing part and the bolt heads. The bolts extend through apertures in the pump housing and are sealed with o-rings.

At least one biasing member 60 is fitted between the retaining ring 38 and the pump housing part 54 for biasing the retaining ring relative to the orbiting scroll. One purpose of the biasing member is to reduce free movement of the retaining member after adjustment so that the thrust surface(s) can be accurately positioned relative to the orbiting scroll. In this example, there are three plate springs associated with respective threaded bolts 44. There is a small amount of play between the threads of the threaded bolts and the threaded bores 50 and the springs causes the bolt thread to bear against the bore thread so that to provide accurate positioning of the retaining member. The play between the threads may be more than the required positional accuracy of the orbiting scroll relative to the fixed scroll (preferably less than 20 microns) and therefore the springs eliminate or reduce this play. In other examples there may be a single biasing member, or alternative springs, such as helical springs. Plate springs, or spring washers, are currently preferred which provide a large spring constant (k).

Additionally the biasing members 60 increase the normal force between threads of the adjustment screws and the bores of the retaining ring so that friction between the threads is increased. Increased friction reduces the possibility of movement of the retaining ring in use for example when gas force on the orbiting scroll becomes large.

In this example, the biasing members 60 exert a biasing force between the housing part 54 and the retaining ring 38 for causing the orbiting scroll to move towards the fixed scroll. The adjustment screws 44 control the movement of the orbiting scroll towards the fixed scroll under the biasing force. In more detail, rotation of the screws in one direction allows biased movement of the orbiting scroll towards the fixed scroll under the biasing force. Rotation of the screws 44 in an opposing direction restricts the biasing members to allow movement of the orbiting scroll away from the fixed scroll. This arrangement allows the force imparted to the ball bearings to be limited by the spring force of the biasing members, which is useful to avoid damage to the ball bearings. In other examples, the adjustment screws may have a complementary threaded engagement with the through bore 52 in the housing part 54 so that their adjustment causes direct movement of the ball bearings.

Referring to FIG. 1, the adjustment mechanism limits the movement (to the right as shown in the Figure) of the orbiting scroll away from the fixed scroll because the ball bearings are caused to bear against the orbiting scroll. When the pump is in use gas pressure between the scrolls causes a three on the orbiting scroll away from the fixed scroll (towards the right in the Figure). Therefore the gas pressure together with limitation of movement sets the position of the orbiting scroll. In this regard, the region 62 is a higher vacuum (lower pressure) than the lower vacuum (higher pressure) region 64. The region 62 is in gas communication with a pump inlet 66 and the region 64 is in gas communication with a pump outlet 68.

During pump start-up, there is insufficient gas pressure to force the orbiting scroll 12 away from the fixed scroll 18 and therefore in the illustrated example a biasing arrangement is provided for biasing the orbiting scroll away from the fixed scroll. The biasing arrangement is shown schematically by arrows 71, 73, 75. Without a biasing arrangement the orbiting scroll could move axially and potentially clash with the fixed scroll. However in the present arrangement, the orbiting scroll is driven by the drive shaft 26 which is supported for rotation by three bearings 70, 72, 74. At least one of these bearings comprises a biasing arrangement for biasing the orbiting scroll away from the fixed scroll. Bearings 70, 72 support a concentric portion of the drive shaft and bearing 72 supports an eccentric portion of the drive shaft 28. The biasing arrangement may be provided by pre-loading one of the bearings with a spring. The biasing arrangement may be provided at bearing 70 or bearing 72 in which case it biases the drive shaft to exert a biasing force on the orbiting scroll. In this arrangement there is a first bearing part, or race, freely sliding relative to the housing and a second bearing part, or race, fixed relative to the shaft and the biasing member biases the freely sliding part to cause the orbiting scroll to move away from the fixed scroll.

An anti-rotation device 80 is shown in FIG. 1 which connects the orbiting scroll relative to the pump housing to allow orbiting motion of the orbiting scroll relative to the fixed scroll but to prevent rotation. The device 80 is shown schematically in the application, but further details of the device are shown and described in our earlier application PCT/GB2011/050688. As an alternative to the shown device, a plurality of cranks may connect to the orbiting scroll. In a further alternative there may be a bellows which functions as an anti-rotation device and an as a seal between lubricated parts of the pump and the pumped flow path. A bellows arrangement is often adopted in a "forward" scroll arrangement, whereas a "reverse" scroll arrangement is shown in the drawings. The invention applies equally to both forward and reverse scroll arrangements, although the reverse scroll arrangement is currently preferred at the date of filing. Forward and reverse scroll arrangements are known to the skilled person and therefore for the sake of brevity only a brief description is provided here.

Figure 5:
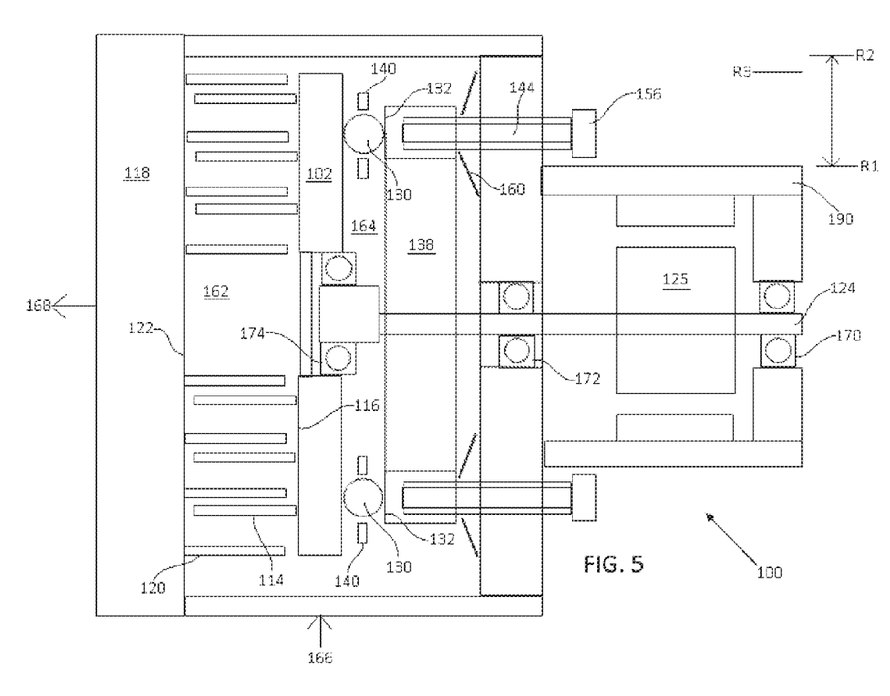
FIG. 5 shows schematically another scroll vacuum pump.

In a reverse scroll arrangement as shown, the drive shaft extends through a central opening in the fixed scroll and is connected to the orbiting scroll on an opposing or distal side of the fixed scroll from the motor. In a forward scroll arrangement the drive shaft is connected to the orbiting scroll without passing through the fixed scroll. The axial thrust bearing arrangement is located on the same side of the scroll arrangement as the motor. A forward scroll arrangement 100 is shown in FIG. 5. In many respects the scroll arrangements in FIGS. 1 and 5 are similar to each and the following description concentrates mainly on the differences between the arrangements.

Referring to FIG. 5, the orbiting scroll 10:2 is located closer to the motor 125 than the fixed scroll. The orbiting scroll has a scroll wall 114 extending from a scroll base 116 towards the fixed scroll. The fixed scroll has a scroll wall 120 extending from a scroll base 122 towards the orbiting scroll. The shaft 124 is supported by bearings 170, 172, 174 for rotation by the motor for causing an orbiting motion of the orbiting scroll 102 relative to the fixed scroll.

In the same way as described in the previous embodiment, the bearing arrangement generates a biasing force which causes the orbiting scroll to be biased away from the fixed scroll. During use a gas force is generated due to the difference in pressure from a higher pressure region 16:2 towards a low pressure region 164 causing a force on the orbiting scroll away from the fixed scroll. As previously described, the thrust bearing arrangement resists this biasing force to accurately set the position of the orbiting scroll.

The thrust bearing arrangement in this embodiment comprises like components as in FIGS. 1 to 4. An array of ball bearings 130 bear against the orbiting scroll base 116 in an axial direction, each ball bearing describing a circular path over the orbiting scroll base during orbiting motion. In this arrangement the ball bearings are located in position by a cage 140. A thrust ring 138 comprises a thrust surface 132 which bears against the array of ball bearings. An adjustment mechanism adjusts the axial position of the thrust surface and thereby the axial position of the orbiting scroll base 116. The adjustment mechanism comprises a similar threaded screw 144 and bore arrangement such that angular movement imparted to a head 156 causes axial displacement of the thrust surface, ball bearings and scroll base.

In this embodiment the casing of the motor has an outer surface of radial width R1 and the casing of the scroll arrangement has an inner surface of radial width R2. The outer radial width of the scroll base 116 is R3. The adjustment mechanism is located at a radial position which is between R1 and R2 to allow adjustment and to cause the ball bearings 130 to bear against the scroll base at a radial position less than R3.

Other adjustment mechanisms could be provided in either embodiment such ones that are motor driven.

The following description applies equally to the embodiment of FIGS. 1 to 4 or of FIG. 5, but for convenience will refer to the first embodiment.

The depth of the scroll walls 14, 18 of the fixed and orbiting scrolls 12, 18 is accurately manufactured within manufacturing tolerances. Manufacturing tolerances may be very small (less than 10 microns) and yet despite accurate manufacturing in previous scroll pump arrangements tip seals are required because assembling the scrolls together does not allow for a sufficiently small spacing between the scrolls (i.e. from one scroll wall to an opposing scroll base) to resist unacceptable leakage for low pressure pumping.

In the present arrangement, assembling the scrolls comprises adjustment of the adjustment mechanism so that the scroll wall of at least one scroll contacts the scroll base of the opposing scroll. After being placed in contact, the adjustment mechanism is operated to cause one scroll to be withdrawn to a selected spacing from the other scroll. In this way, the contact relationship between the scrolls acts as a datum from which the scrolls can be withdrawn to a selected spacing, which in the present arrangement may be less than 20 microns and preferably between about 5 and 15 microns.

It may be the case depending on manufacturing tolerances that both scroll walls contact the opposing scroll base during this first step of assembly. Typically though when the scrolls are adjusted a first scroll wall contacts the scroll base of the second scroll and the second scroll wall is spaced at least a few microns from the scroll base of the first scroll because a small distance in depth of the scroll walls. However, the current assembly methodology is capable of reducing the net spacing between scrolls to a practical minimum.

Additionally it may actually be preferable that the walls of the orbiting scroll are shorter in the axial direction because the orbiting scroll becomes hotter in use and is liable to greater thermal expansion.

In more detail, during assembly of the scrolls as illustrated the fixed scroll 18 is fixed in position relative to the pump housing and supports the drive shaft portions 24, 26 and bearings 70, 72. The orbiting scroll is supported by drive shaft portion 28 and bearing 74 and is biased away from the fixed scroll by one or more of the bearings. The adjustment mechanism is adjusted by rotation of the threaded members 44 in threaded bores 50 to cause or allow movement of the retaining ring 38 so that the ball bearings 30 are brought into contact with the orbiting scroll and further movement causes the ball bearings to move the orbiting scroll into contact with the fixed scroll so that at least one scroll wall contacts the scroll base of the opposing scroll. A torque sensor may be used to sense when a predetermined torque has been attained to avoid damage to the scrolls from excessive force.

When one or both scrolls are in contact providing the datum or reference positioning of the scrolls, the threaded members are rotated in the threaded bores in a counter direction to allow movement of the retaining ring and orbiting scroll away from the fixed scroll by a selected distance under biasing force 71, 73, 75 provided at one or more of the bearings 70, 72, 74. In this regard, the pitch 'P' between threads is known and therefore rotation of the threaded member by a selected angle θ causes a spacing between scrolls equal to P*θ/360'. Typically, for convenience the threaded member is rotated through either 90 or 180 degrees to cause a spacing of ¼ or ½ P respectively. Therefore for example if the pitch is 500 microns a quarter turn produces a spacing of 125 microns.

The spacing between the scrolls is selected so that the running clearance is as small as possible to reduce leakage across the scroll walls (between the scroll walls and the opposing scroll base) but sufficient to avoid clashing when the orbiting scroll deflects and to allow for thermal expansion. In one example, the end surface of one or both scroll walls has a PTFE coating. The coating may have a thickness in the region of 25 μm.

Such a coating protects the scrolls if there is any contact in use and also reduces friction during any such contact.

As illustrated in the Figures, there is a plurality of adjustment members that are angularly spaced apart. Accordingly, depending on the pre-adjusted relative positioning of the scrolls (e.g. they are not quite square or angled one to the other), one adjustment member may be required to be adjusted by a greater distance than another to cause contact between the scrolls at angularly spaced apart positions. For example, the bearing 74 may not quite be square or there may be a difference in depth of the scroll wall. In this way, the adjustment mechanism can be adjusted by different axial distances depending on the angle about the axis and then subsequently withdrawn by a selected distance to cause a generally uniform spacing about the circumference of the scrolls.

In use, the adjustment mechanism causes the ball bearings 30 to bear against the orbiting scroll to limit movement of the orbiting scroll away from the fixed in an axial direction. The biasing members generate a biasing force in the axial direction which causes the orbiting scroll to bear against the ball bearings and subsequently gas force between the scrolls increases the force on the orbiting scroll against the ball bearings. Therefore there are forces on the orbiting scroll in both axial directions which together set the axial position of the orbiting scroll and spacing from the fixed scroll.

When in use there is thermal expansion of components of the pump with increased operating temperature, particularly the orbiting scroll, even though the material of the components are chosen for low thermal expansion. For example, the scrolls may be made of aluminium. The spacing selected between the scrolls takes account of thermal expansion so that the scrolls do not clash, or contact, in use. However, it is desirable as discussed above to maintain this spacing to minimum practical. Initially therefore, prior to thermal expansion, there is a gap between the scrolls allowing some leakage across the scroll walls. After thermal expansion the gap between scrolls is reduced.

In known designs the gap between the scrolls is sealed by tip seals, which cause tip seal dust when abraded. An advantage of the present arrangement that the spacing between the scrolls can be more accurately set and therefore tip seals may be eliminated, which in itself is an advantage for use with clean applications. Additionally the present arrangement allows a more compact scroll pump. In this regard, in order to provide a scroll wall with a tip seal a channel is formed in the axial end of the scroll wall. As the tip seal is required to have a width of at least 2 mm the scroll wall is required to have a width of about 4 mm in order to provide space to fit the channel in the end. Without a tip seal the width of the scroll wall can be reduced to about 0.8 to 1 mm so that the pump size can be reduced or a greater number of wraps can be accommodated in the pump. If the size of the scroll walls is reduced the size of the scroll plates can be reduced and the rotor can be orbited at a higher frequency. A higher frequency allows a smaller pump to be used to pump at the same pressure. For example, the pump may have a scroll diameter of less than 100 mm. It may be rotated at a frequency of 5,000 RPM or higher. Pumps according to the present arrangement are capable of generating pressures at the inlet of between about 1 and 0.01 mbar and exhausting in the region of atmosphere with compression ratios of 1000 to 100,000.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A scroll vacuum pump comprising:
   an orbiting scroll having an orbiting scroll wall extending axially from an orbiting scroll base towards a fixed scroll, the fixed scroll having a fixed scroll wall extending axially from a fixed scroll base towards the orbiting scroll;
   an axially extending drive shaft having an eccentric shaft portion so that rotation of the eccentric shaft portion imparts an orbiting motion to the orbiting scroll relative to the fixed scroll; and
   an axial thrust bearing arrangement comprising:
   an array of ball bearings for bearing against the orbiting scroll base in an axial direction, each ball bearing describing a circular path over the orbiting scroll base during orbiting motion;
   a retainer having at least one thrust surface for bearing against the array of ball bearings and a plurality of bores;
   an adjustment mechanism comprising a plurality of adjustment members for adjusting an axial position of said at least one thrust surface and thereby an axial position of the orbiting scroll base; and
   a plurality of biasing members for biasing the plurality of adjustment members relative to the at least one thrust surface, each of said plurality of biasing members being for a respective adjustment member of the plurality of adjustment members for causing threads of the respective adjustment member to bear against threads of a respective bore of the plurality of bores in the retainer for resisting play between the threads and/or increasing friction therebetween.

2. The scroll vacuum pump as claimed in claim 1, wherein the retainer retains the ball bearings in location relative to said at least one thrust surface and the orbiting scroll.

3. The scroll vacuum pump as claimed in claim 1, wherein the plurality of adjustment members are angularly spaced apart about an axis of the pump operable for adjusting the axial position of the at least one thrust surface.

4. The scroll vacuum pump as claimed in claim 3, wherein the plurality of adjustment members are co-operable with the retainer for adjusting the axial position and/or angle of the retainer.

5. The scroll vacuum pump as claimed in claim 4, wherein rotation of the adjustment members causes adjustment of the axial position and/or angle of the retainer.

6. The scroll vacuum pump as claimed in claim 1, wherein the biasing members bias movement of the orbiting scroll towards the fixed scroll, wherein the amount of biased movement of the orbiting scroll is controlled by the adjustment mechanism.

7. The scroll vacuum pump as claimed in claim 1, comprising an orbiting scroll biasing arrangement for biasing the orbiting scroll towards the adjustment mechanism for causing the orbiting scroll to bear against the ball bearings.

8. A method of assembling a scroll vacuum pump, the scroll vacuum pump comprising:
   an orbiting scroll having an orbiting scroll wall extending axially from an orbiting scroll base towards a fixed scroll, the fixed scroll having a fixed scroll wall extending axially from a fixed scroll base towards the orbiting scroll;
   an axially extending drive shaft having an eccentric shaft portion so that rotation of the eccentric shaft portion imparts an orbiting motion to the orbiting scroll relative to the fixed scroll; and
   an axial thrust bearing arrangement comprising:
   an array of ball bearings for bearing against the orbiting scroll base in an axial direction, each ball bearing describing a circular path over the orbiting scroll base during orbiting motion;
   a retainer having at least one thrust surface for bearing against the array of ball bearings and a plurality of bores;
   an adjustment mechanism comprising a plurality of adjustment members for for adjusting an axial position of said at least one thrust surface and thereby an axial position of the orbiting scroll base; and
   a plurality of biasing members for biasing the plurality of adjustment members relative to the at least one thrust surface, each of said plurality of biasing members being for a respective adjustment member of the plurality of adjustment members for causing threads of the respective adjustment member to bear against threads of a respective bore of the plurality of bores in the retainer for resisting play between the threads and/or increasing friction therebetween;
   wherein in a first assembly step the adjustment mechanism is adjusted to cause the orbiting scroll and the fixed scroll to contact to provide a datum position of the scrolls, and in a second assembly step the adjustment mechanism is adjusted to cause the orbiting scroll and the fixed scroll to be moved apart by a selected spacing relative to the datum position.

9. The method of assembling a scroll vacuum pump as claimed in claim 8, wherein an orbiting scroll biasing arrangement biases movement of the orbiting scroll towards the ball bearings so that in the second assembly step the orbiting scroll bears against the ball bearings to locate the orbiting scroll and fixed scroll at the selected spacing.

\* \* \* \* \*